United States Patent
Geckle et al.

(10) Patent No.: US 9,508,075 B2
(45) Date of Patent: Nov. 29, 2016

(54) AUTOMATED TRANSACTION CANCELLATION

(71) Applicant: Cellco Partnership, Arlington, VA (US)

(72) Inventors: Jonathan E. Geckle, Everett, WA (US); Robert E. Arnold, Simpsonville, SC (US)

(73) Assignee: Cellco Partnership, Basking Ridge, NJ (US)

( * ) Notice: Subject to any disclaimer, the term of this patent is extended or adjusted under 35 U.S.C. 154(b) by 49 days.

(21) Appl. No.: 14/105,573

(22) Filed: Dec. 13, 2013

(65) Prior Publication Data

US 2015/0170147 A1    Jun. 18, 2015

(51) Int. Cl.
| | | |
|---|---|---|
| *G06Q 40/00* | (2012.01) | |
| *G06Q 20/40* | (2012.01) | |
| *G06Q 40/02* | (2012.01) | |

(52) U.S. Cl.
CPC .......... *G06Q 20/4016* (2013.01); *G06Q 40/02* (2013.01)

(58) Field of Classification Search
CPC ...... G06Q 10/00; G06Q 20/00; G06Q 30/00; G06Q 40/00
USPC ..................................................... 705/3–44
See application file for complete search history.

(56) References Cited

U.S. PATENT DOCUMENTS

| | | | | |
|---|---|---|---|---|
| 7,869,783 | B2* | 1/2011 | Morton ................. | H01Q 3/247 455/272 |
| 8,175,897 | B2* | 5/2012 | Lee et al. .......................... | 705/4 |
| 8,458,069 | B2* | 6/2013 | Adjaoute ............... | G06Q 40/02 705/318 |
| 8,600,873 | B2* | 12/2013 | Fisher ............................. | 705/38 |
| 8,606,712 | B2* | 12/2013 | Choudhuri et al. ........... | 705/42 |
| 8,924,279 | B2* | 12/2014 | Liu ........................ | G06Q 20/40 705/37 |
| 2009/0192957 | A1* | 7/2009 | Subramanian ......... | G06Q 10/04 706/21 |
| 2009/0307028 | A1* | 12/2009 | Eldon .................... | G06Q 20/12 705/37 |
| 2011/0282789 | A1* | 11/2011 | Carroll et al. .................. | 705/44 |
| 2013/0013514 | A1* | 1/2013 | Mackouse ....................... | 705/44 |
| 2013/0024358 | A1* | 1/2013 | Choudhuri et al. ........... | 705/38 |
| 2014/0046827 | A1* | 2/2014 | Hochstatter et al. .......... | 705/38 |
| 2014/0180974 | A1* | 6/2014 | Kennel et al. .................. | 706/12 |

* cited by examiner

*Primary Examiner* — Frantzy Poinvil

(57) ABSTRACT

A system that investigates, identifies and cancels fraudulent transactions comprises a fraud detection server that receives a first dataset indicating a quantity of fraud-transactions. The first dataset is generated at least in part by a fraud-score model. The system receives a second dataset including a quantity of false positive fraud-transactions from the fraud transactions. The system calculates a fraud error rate using the quantity of fraud-transactions and the quantity of false positive fraud-transactions. The system generates a new fraud-score model when the fraud error rate exceeds a predefined error rate.

18 Claims, 9 Drawing Sheets

| Transaction ID | Who | What | Fraud Model5 _Hit | Fraud Model6 _Hit | Fraud Model7 _Hit | Fraud Model8 _Hit | FPD _EMAIL | FPD _IP | FPD _SSN | ORDER _AMT |
|---|---|---|---|---|---|---|---|---|---|---|
| 1 | Joe | New Phone | 1 | 1 | 1 | 1 | 1 | 1 | 1 | $185 |
| 2 | Jane | New Phone | 0 | 0 | 1 | 1 | 1 | 1 | 1 | $132 |
| 3 | Sally | New Phone | 0 | 0 | 0 | 0 | 0 | 0 | 1 | $150 |
| 4 | Mark | New Phone | 1 | 1 | 1 | 1 | 1 | 1 | 1 | $50 |
| 5 | Zack | New Phone | 0 | 1 | 1 | 0 | 1 | 0 | 0 | $125 |

| Model Variable | Attribute Name | Value Attribute Bin | Attribute Value | Min Attribute Value | Max Attribute Value | Fraud Count | Total Count | Pct. Fraud of Attribute | Pct. of Total Fraud |
|---|---|---|---|---|---|---|---|---|---|
| Fraud_Model_5_Hit_bin2 | FraudModel5_Hit | 2 | 0 | | | 2148 | 5818 | 36.92 | 49.93 |
| Fraud_Model_6_Hit_bin2 | FraudModel6_Hit | 2 | 0 | | | 3926 | 9197 | 42.69 | 91.26 |
| Fraud_Model_7_Hit_bin2 | FraudModel7_Hit | 2 | 0 | | | 3820 | 9036 | 42.28 | 88.8 |
| Fraud_Model_8_Hit_bin1 | FraudModel8_Hit | 1 | 1 | | | 742 | 922 | 80.48 | 17.25 |
| FraudProfileData_EMAIL_bin2 | FPD_EMAIL | 2 | 0 | | | 3766 | 9252 | 40.7 | 87.54 |
| FraudProfileData_IP_bin2 | FPD_IP | 2 | 0 | | | 3691 | 9177 | 40.22 | 85.8 |
| FraudProfileData_SSN_bin2 | FPD_SSN | 2 | 0 | | | 3823 | 9309 | 41.07 | 88.87 |
| ORDER_AMT_bin1 | ORDER_AMT | 1 | | 100 | 200 | 2574 | 4893 | 52.61 | 59.83 |

FIG-3

| Model Variable | Estimate | ProbChiSq |
|---|---|---|
| Fraud_Model_5_Hit_bin2 | -0.883 | <.0001 |
| Fraud_Model_6_Hit_bin2 | -1.1786 | <.0001 |
| Fraud_Model_7_Hit_bin2 | -0.7894 | <.0001 |
| Fraud_Model_8_Hit_bin1 | 0.8615 | <.0001 |
| FraudProfileData_EMAIL_bin2 | -5.6531 | <.0001 |
| FraudProfileData_IP_bin2 | -6.0698 | <.0001 |
| FraudProfileData_SSN_bin2 | -5.3302 | <.0001 |
| ORDER_AMT_bin1 | 0.4861 | <.0001 |

FIG-4

| Demi-decile | Cumulative % of data-set | Total samples in demi-decile | Total Fraud in demi-decile | Cumulative Total Fraud | Average Predicted Fraud Probability | Minimum Predicted Fraud Probability | Maximum Predicted Fraud Proability | % Fraud in Demi-decile | Cumulative % Fraud in Demi-deciles | % Total Fraud | Cumulative % Fraud | Lift | Cumulative Lift |
|---|---|---|---|---|---|---|---|---|---|---|---|---|---|
| 0 | 5% | 489 | 487 | 487 | 100% | 100% | 100% | 100% | 100% | 11% | 11% | 2.27 | 2.27 |
| 1 | 10% | 489 | 489 | 976 | 100% | 100% | 100% | 100% | 100% | 11% | 23% | 2.28 | 2.27 |
| 2 | 15% | 490 | 370 | 1346 | 79% | 58% | 100% | 76% | 92% | 8.60% | 31% | 1.72 | 2.09 |
| 3 | 20% | 489 | 276 | 1622 | 56% | 51% | 58% | 56% | 83% | 6.40% | 38% | 1.28 | 1.89 |
| 4 | 25% | 490 | 267 | 1889 | 51% | 51% | 51% | 54% | 77% | 6.20% | 44% | 1.24 | 1.76 |
| 5 | 30% | 489 | 249 | 2138 | 51% | 51% | 51% | 51% | 73% | 5.80% | 50% | 1.16 | 1.66 |
| 6 | 35% | 490 | 252 | 2390 | 51% | 51% | 51% | 51% | 70% | 5.90% | 56% | 1.17 | 1.59 |
| 7 | 40% | 489 | 234 | 2624 | 49% | 46% | 51% | 48% | 67% | 5.40% | 61% | 1.09 | 1.53 |
| 8 | 45% | 490 | 187 | 2811 | 39% | 39% | 46% | 38% | 64% | 4.30% | 65% | 0.87 | 1.45 |
| 9 | 50% | 489 | 183 | 2994 | 39% | 39% | 39% | 37% | 61% | 4.30% | 70% | 0.85 | 1.39 |
| 10 | 55% | 489 | 207 | 3201 | 39% | 37% | 39% | 42% | 59% | 4.80% | 74% | 0.96 | 1.35 |
| 11 | 60% | 490 | 185 | 3386 | 34% | 30% | 37% | 38% | 58% | 4.30% | 79% | 0.86 | 1.31 |
| 12 | 65% | 489 | 162 | 3548 | 30% | 30% | 30% | 33% | 56% | 3.80% | 82% | 0.75 | 1.27 |
| 13 | 70% | 490 | 125 | 3673 | 30% | 30% | 30% | 26% | 54% | 2.90% | 85% | 0.58 | 1.22 |
| 14 | 75% | 489 | 140 | 3813 | 29% | 21% | 30% | 29% | 52% | 3.30% | 89% | 0.65 | 1.18 |
| 15 | 80% | 490 | 102 | 3915 | 21% | 21% | 21% | 21% | 50% | 2.40% | 91% | 0.47 | 1.14 |
| 16 | 85% | 489 | 91 | 4006 | 21% | 21% | 21% | 19% | 48% | 2.10% | 93% | 0.42 | 1.1 |
| 17 | 90% | 490 | 104 | 4110 | 21% | 21% | 21% | 21% | 47% | 2.40% | 96% | 0.48 | 1.06 |
| 18 | 95% | 489 | 108 | 4218 | 21% | 21% | 21% | 22% | 45% | 2.50% | 98% | 0.5 | 1.03 |
| 19 | 100% | 490 | 84 | 4302 | 21% | 21% | 21% | 17% | 44% | 2.00% | 100% | 0.39 | 1 |
| Total | | 9789 | 4302 | | | | | | 44% | | | | |

| Fraud Score Threshold | Total | Cumulative Total Orders | Cumulative Orders per Day | Total Fraud | Cumulative Total Fraud | Total False Positives | Cumulative false positives | Cumulative Error Rate |
|---|---|---|---|---|---|---|---|---|
| 1 | 385 | 385 | 12.83 | 384 | 384 | 1 | 1 | 0.26% |
| 0.9999 | 2 | 387 | 12.9 | 2 | 386 | 0 | 1 | 0.26% |
| 0.9998 | 2 | 389 | 12.97 | 2 | 388 | 0 | 1 | 0.26% |
| 0.9995 | 3 | 392 | 13.07 | 3 | 391 | 0 | 1 | 0.26% |
| 0.9993 | 13 | 405 | 13.5 | 13 | 404 | 0 | 1 | 0.25% |
| 0.9991 | 26 | 431 | 14.37 | 26 | 430 | 0 | 1 | 0.23% |
| 0.999 | 11 | 442 | 14.73 | 11 | 441 | 0 | 1 | 0.23% |
| 0.9989 | 11 | 453 | 15.1 | 11 | 452 | 0 | 1 | 0.22% |
| 0.9988 | 3 | 456 | 15.2 | 2 | 454 | 1 | 2 | 0.44% |
| 0.9986 | 18 | 474 | 15.8 | 18 | 472 | 0 | 2 | 0.42% |
| 0.9985 | 14 | 488 | 16.27 | 14 | 486 | 0 | 2 | 0.41% |
| 0.9983 | 53 | 541 | 18.03 | 53 | 539 | 0 | 2 | 0.37% |
| 0.998 | 10 | 551 | 18.37 | 10 | 549 | 0 | 2 | 0.36% |
| 0.9978 | 79 | 630 | 21 | 79 | 628 | 0 | 2 | 0.32% |
| 0.9977 | 37 | 667 | 22.23 | 37 | 665 | 0 | 2 | 0.30% |
| 0.9976 | 1 | 668 | 22.27 | 1 | 666 | 0 | 2 | 0.30% |
| ... | ... | ... | ... | ... | ... | ... | ... | ... |
| 0.8194 | 3 | 1156 | 38.53 | 3 | 1152 | 0 | 4 | 0.35% |
| 0.7701 | 21 | 1177 | 39.23 | 14 | 1166 | 7 | 11 | 0.93% |
| 0.7676 | 3 | 1180 | 39.33 | 0 | 1166 | 3 | 14 | 1.20% |
| 0.7662 | 18 | 1198 | 39.93 | 8 | 1174 | 10 | 24 | 2.00% |
| 0.7092 | 133 | 1331 | 44.37 | 101 | 1275 | 32 | 56 | 4.20% |
| 0.6941 | 5 | 1336 | 44.53 | 2 | 1277 | 3 | 59 | 4.40% |
| 0.6895 | 5 | 1341 | 44.7 | 0 | 1277 | 5 | 64 | 4.80% |
| 0.6732 | 39 | 1380 | 46 | 30 | 1307 | 9 | 73 | 5.30% |
| 0.6684 | 2 | 1382 | 46.07 | 2 | 1309 | 0 | 73 | 5.30% |
| 0.6 | 14 | 1396 | 46.53 | 6 | 1315 | 8 | 81 | 5.80% |
| 0.5826 | 97 | 1493 | 49.77 | 43 | 1358 | 54 | 135 | 9.00% |
| 0.5807 | 329 | 1822 | 60.73 | 189 | 1547 | 140 | 275 | 15% |
| 0.5773 | 15 | 1837 | 61.23 | 2 | 1549 | 13 | 288 | 16% |
| 0.5075 | 1783 | 3620 | 120.67 | 922 | 2471 | 861 | 1149 | 32% |
| 0.5021 | 165 | 3785 | 126.17 | 87 | 2558 | 78 | 1227 | 32% |
| 0.4841 | 35 | 3820 | 127.33 | 16 | 2574 | 19 | 1246 | 33% |
| 0.46 | 100 | 3920 | 130.67 | 52 | 2626 | 48 | 1294 | 33% |

| Transaction ID | Who | What | Fraud Model5 Hit | Fraud Model6 Hit | Fraud Model7 Hit | Fraud Model8 Hit | FPD EMAIL | FPD IP | FPD SSN | ORDER AMT | Fraud Score | Auto Canceled | False Positive | Fraud |
|---|---|---|---|---|---|---|---|---|---|---|---|---|---|---|
| 1 | Joe | New Phone | 1 | 1 | 1 | 1 | 1 | 1 | 1 | $185 | 100% | Yes | No | Yes |
| 2 | Jane | New Phone | 0 | 0 | 1 | 1 | 1 | 1 | 1 | $132 | 40% | No | - | Yes |
| 3 | Sally | New Phone | 0 | 0 | 0 | 0 | 0 | 0 | 1 | $150 | 10% | No | - | No |
| 4 | Mark | New Phone | 1 | 1 | 1 | 1 | 1 | 1 | 1 | $50 | 99.94% | Yes | Yes | No |
| 5 | Zack | New Phone | 0 | 1 | 1 | 0 | 1 | 0 | 0 | $125 | 58.50% | No | - | Yes |

1000

AUTOMATED TRANSACTION CANCELLATION

BACKGROUND INFORMATION

A business has systems that receive and process orders from customers. The systems record the orders as transactions. Unfortunately, some of these transactions will be fraudulent. While it is desirable for the business to identify and eliminate the fraudulent transactions as soon as possible, preferably before fulfillment, or to cancel service as soon as it is determined the transaction is fraudulent, this is not always possible. In particular, for large businesses in which many transactions occur in relatively short time periods and/or many different layers exist for each of these transactions, the known approaches to investigate, identify and cancel fraudulent transactions are both complicated and cumbersome.

BRIEF DESCRIPTION OF THE DRAWINGS

FIG. 2 is an exemplary transaction chart.

FIG. 3 is a bin detail chart that illustrates data bins that may serve as inputs to generate fraud-score models.

FIG. 4 is a bins statistics chart that illustrates the statistical relationship of bins to fraud-transactions.

FIG. 5 is a demi-decile gains chart that shows fraud probability for a dataset grouped in 5% increments with fraud-scores for comparison.

FIG. 6 is an error rate chart that shows the fraud-score and cumulative false positive error rate.

FIG. 10 is an exemplary transaction chart with fraud disposition information.

DETAILED DESCRIPTION

A fraud cancellation system of an organization is provided in which multiple fraud models flag transactions that are at risk for being fraudulent as fraudrisk transactions. The system reviews the fraudrisk transactions with a fraud cancellation model that may include a fraud-score model and a fraud-score cancellation-threshold. If the fraud-score model predicts a fraud-score for a transaction that exceeds the fraud-score cancellation-threshold then the system may suspend that transaction, mark it as an auto-cancel fraud-transaction and schedule it for cancellation. The system may investigate the transactions that are not auto canceled to make a determination whether the transaction is fraudulent, and if so cancel the transaction. While an auto-cancel fraud-transaction is scheduled for cancellation, the system may accept communication from a customer and then determine that the referenced transaction was not fraudulent and reinstate the transaction, marketing it as a false positive auto-cancel fraud-transaction, i.e. a false positive transaction. The system may monitor an error rate of the fraud cancellation model; for example, the system may consider the false positive transactions to be errors and calculate the error rate as the amount of false positives divided by the amount of auto-canceled transactions. When the error rate exceeds a preset limit, then the system may generate a new fraud cancellation model using a statistical model generator based on the latest fraudrisk transactions. In this way, the fraud cancellation system can automatically adjust to the latest fraud techniques that criminals are perpetrating on the organization.

Figure 1:
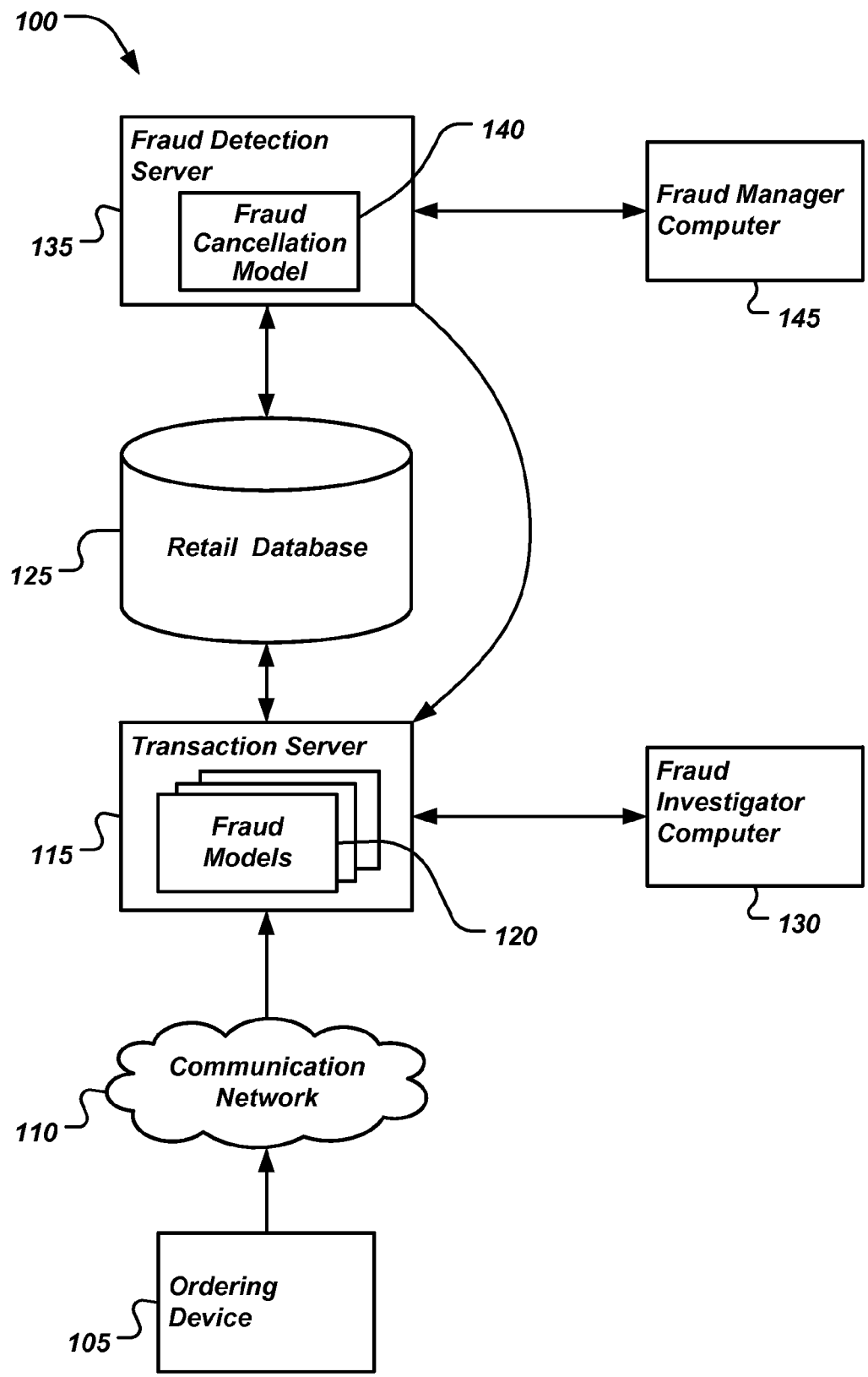
FIG. 1 illustrates an exemplary system configured to detect cancel and improve the detection and cancellation of potentially fraudulent transactions.

FIG. 1 illustrates an exemplary system 100 for detecting and canceling, including auto canceling, fraud transactions where the system includes monitoring and improving the auto cancellation of fraud transactions. The system 100 may take many different forms and include multiple and/or alternate components and facilities. While the figures show an exemplary system 100, the exemplary components illustrated in the Figures are not intended to be limiting. Indeed, one may expect in a particular implementation additional or alternate components or configurations.

As illustrated in FIG. 1, the system 100 may include an ordering device 105 connected by a communication network 110 to a transaction server 115. The system 100 may have the transaction server 115 connected to a retail database 125, a fraud investigator computer 130 and a fraud detection server 135. The transaction server 115 may include various fraud models 120. The system 100 may have the fraud detection server 135 also connected to the retail database 125 and a fraud manager computer 145 that the person managing the fraud department uses. The fraud detection server 135 may include a fraud cancellation model 140, which may have a fraud-score model and a fraud-score cancel-threshold.

The ordering device 105 may include a processor and memory configured to allow the ordering device 105 to carry out retail transactions over the communication network 110. In one exemplary approach, the ordering device 105 may allow a customer to carry out retail transactions over the communication network 110. A customer may use the ordering device 105 to initiate a transaction. Using the ordering device 110, the customer may carry out a retail transaction (e.g., placing an order for a product to be shipped to the user) with an online retailer. The user may use the ordering device 105 to access a retail webpage, select one or more items for purchase, enter billing and shipping information, and confirm the purchase. Alternatively, the ordering device 105 may be a retail point-of-sale computer in a brick-and-mortar retail store. The ordering device 105 may include any one or more of a desktop computer, a laptop computer, a mobile phone, a tablet computer, or similar or related devices. The ordering device 105 may communicate order attribute information associated with the retail transaction to the transaction server 115 for processing and fulfillment.

The communication network 110 is an electronic network that allows the ordering device 105 to communicate with the transaction server 115. The communication network 110 may include some combination of Bluetooth®, Wi-Fi (IEEE 802.11), Ethernet (IEEE 802.3), TCP/IP, Local Area Network (LAN), Wide Area Network (WAN), the Internet, a cellular network, Code Division Multiplex Access (CDMA), Global System for Mobile communication (GSM), High-Speed Downlink Packet Access (HSPDA), Universal Mobile Telecommunications System (UMTS), High-Speed Packet Access (HS PA), WiMAX, and Long-Term Evolution (LTE) or other technologies that enable electronic communications.

The transaction server 115 may include a processor and memory configured to facilitate the application of various fraud models 120 to incoming retail transactions or retail transactions already stored in the retail database 125. The transaction server 115 may have fraud models 120, for example a plurality of fraud models. In one approach there could be up to fifty (50) or more fraud models to flag transactions as fraudrisk transactions; Reference is made to U.S. patent application Ser. No. 13/655,759 titled "Automatic Fraud Detection," hereinafter referred to as the '759 application, which is incorporated herein by reference in its entirety. Each fraud model 120 may act as a filter that queries the retail database 125 for transactions that have particular attributes. The transaction server 115 may indicate the transactions that fit the fraud model 120 in the retail database 125 as fraud model hits. The transaction server 115 may receive the fraud models 120 from the fraud detection server 135, where the fraud detection server 135 created the fraud models 120 based on historical fraudrisk transaction stored in the retail database 125. The fraudrisk transactions may be investigated by a fraud investigator utilizing the fraud investigator computer 130, where the investigation determines if the transaction is fraudulent, i.e. a fraud-transaction. A fraud-transaction is a transaction that the system 100 has determined to be fraudulent. The system 100 may determine a transaction is fraudulent by a fraud investigation and/or by a determination of the fraud cancellation model 140.

The retail database 125 may include a processor and memory configured to store previous retail transactions and their associated attributes. Thus, the retail database 125 stores current and historical information about retail transactions. The retail database 125 may store historical information going back any amount of time. For instance, the historical information may include retail transactions from the last week, six months, or even years depending on various factors such as database size, storage space, etc.

In the retail database 125, each retail transaction may be associated with one or more transaction attributes. Table 1 show the types of transaction attributes and provide examples of the various types of transaction attributes. Generally, a transaction attribute may describe a characteristic of the transaction. The characteristic could be related to the order itself, the customer who made the purchase, the retailer originating the transaction, aspects of the communication network 110 the transaction came through, fraudrisk attributes (like a fraud model 120 results for the transaction) and fraud disposition information. Any of these and possibly other attributes may be associated with each retail transaction and stored in one or more retail databases 125, which may be part of or separate from the transaction server 115. The fraudrisk transactions are a subset of the transactions in the retail database 125, the transactions with fraudrisk indicated the fraudrisk attributes.

TABLE 1

| Transaction Attributes | |
|---|---|
| Transaction Attribute Group | Transaction Attribute Examples |
| Order | order identifier |
| | purchase price |
| | purchase date |
| | shipping address |
| | billing address |
| | is the shipping and billing addresses the same |
| | item descriptions |
| | quantity of products purchased |
| | total order amount |
| | method of payment |
| | . . . |

TABLE 1-continued

| Transaction Attributes | |
|---|---|
| Transaction Attribute Group | Transaction Attribute Examples |
| Customer | name |
| | email |
| | street address |
| | phone number |
| | credit score |
| | social security number (SSN) |
| Retailer | identifier |
| | name |
| | address |
| Communication network | IP address of the ordering device |
| | IP addresses of the computers that the transaction passed through |
| Fraud Risk Attributes | Summaries of other attributes associated to the transaction or other indicators of fraudrisk. |
| Fraud Disposition Information | fraud-transaction |
| | auto-cancel |
| | false positive |

The transaction order attributes may include an order identifier, the purchase price, the purchase date, the purchase time, the shipping address (e.g., street name, city, state, ZIP code, country, etc.), the billing address (e.g., street name, city, state, ZIP code, country, etc.), whether the shipping and billing addresses are the same, a description of the product purchased, the number of products purchased, the total order amount, the method of payment, or other similar attributes related to the order. Transaction customer attributes may include the purchaser's name, email, street address, phone number, credit score, social security number (SSN) or other attributes related to the customer who placed the order. The transaction retail attributes may include a retailer's identifier, name, address or other information related to the retailer.

The transaction network attributes are related to the communication network 110 that the transaction came through and may include the IP address of the ordering device 105, the IP address of the retailer's server, the IP addresses of the computers that the transaction passed through in the communication network 110 on its way to the transaction server 115, or other similar information gathered from the communication network 110 as the transaction made its way to the transaction server 115.

The transaction fraudrisk attributes may include summaries of other attributes associated to the transaction or other indicators of fraudrisk. For example, the database server 125 may have fields that are indicators of fraudrisk transactions, specifically results of fraud models 120 that indicate that a transaction had the order attributes, retailer attributes, or network attributes that match a particular fraud model's filter criteria. Other indicators of fraud risk may be customer complaints, customer disputes, an ordered apparatus such as a mobile phone that is never activated and indicators of no intent to pay (such as not paying the bill on time or being 30 days late etc.), Police reports, or any information found to correlate with fraud-transactions. When a customer calls up with a complaint or a dispute, the complaint or dispute may be recorded in a customer relationship management computer system. Customer complaints or disputes may be associated to specific transactions or with the customer itself. The complaint or dispute can be added to the fraud detection server 135, and correlated either through the order identifier directly or indirectly through the customer. If an ordered apparatus such as a shipped out but is never activated, as can be reported by the cellphone-tower network monitoring system, this information may be reported to the fraud detection server 135, where the device's unique identifier can be correlated to the purchase transaction in the retail database 125. If there are indicators that there is no intent to pay, such as being late on the first payment, that can be captured by an account receivable system, which may have the order identifier that can be correlated to the order identifier in the retail transaction database 125. Police reports may be provided that have names of known offenders and those names can be checked against the names of the customers that are associated to the transactions in the retail database 125.

The transaction fraud disposition attributes may include fraud determination information such as a fraud-transaction, auto-cancel or was a false positive attribute. The fraud-transaction attribute may be set either by the fraud investigator computer 130 after a fraud investigation determines the transaction was fraudulent, or by the fraud detection server 135 after the fraud cancellation model 140 determines the transaction is a fraud-transaction. The auto cancel attribute can be set by the fraud detection server 135 again after the fraud cancellation model 140 determines the transaction is fraudulent. The false positive attribute indicates the transaction was flagged as an auto-cancel fraud-transaction by the fraud detection server 135, but the fraud investigator computer 130 later reinstated the auto-canceled transaction based on communication from the customer. For example, the transaction could be reinstated after communication from the customer, e.g. a phone call, email, real-time discussion, such as chat etc., convinces a fraud investigator that the auto-canceled transaction was not fraudulent, and then the fraud investigator directs the fraud investigator computer 130 to reinstate the transaction.

The fraud investigator computer 130 may receive an indication of a potentially fraudulent transaction, i.e. fraudrisk transactions, from the transaction server 115 and, using a processor and memory, notify a fraud investigator that indicates that an incoming retail transaction is a fraudrisk transaction. The fraud investigator may then investigate the incoming retail transaction to verify whether it is indeed fraudulent. The fraud investigators may be employees of the retailer, employees of a third party working with the retailer, or members of law enforcement. Accordingly, the fraud investigator computer 130 may be located at a site owned or operated by the retailer or a third party working with the retailer, or alternatively, the fraud investigator computer 130 may be located at a different site, such as a police station or other law enforcement agency.

The notification of the potentially fraudulent transaction may be provided to the fraud investigator as a list of transactions that require investigations to make a determination if the transactions are fraudulent. The list of transactions may be updated in real time with the fraud investigator computer 130 having an application that directly pulls information from the transaction server 115. In an alternative exemplary approach, the fraud models 120 and fraud cancellation model 140 may periodically run and update the column that indicates a transaction is a fraud risk transaction that requires further analysis. In one illustrative approach the fraud investigations should be completed quickly and within a time frame permitting cancellation if found to be improper (e.g., within two or three days if a shipment is scheduled at a later date).

The fraud investigator computer 130 may be used by a fraud investigator to investigate an auto-cancel fraud-transaction when a customer inquires as to the status of their order that has been suspended and scheduled for cancellation, for example in 3 days. This time will allow a legitimate customer to call and inquire about why their order is late. If the customer contact occurs while the auto cancel fraud-transaction is still suspended and is scheduled for cancellation then a fraud investigator may reinstate the transaction, identifying the transaction as a false positive fraud-transaction, if they are convinced the transaction is not a fraud-transaction. For example, a customer, Mark, may place an order for a new phone on January 1. The order may be is recorded by the Transaction server 115 in the retail database 125. The fraud cancellation model 140 processed Mark's transaction on January 1 and found that it meet the criteria for auto cancellation, so the transaction was suspended and was scheduled for cancellation on January 4. On January 3, Mark goes online to check the status of his order and finds it is suspended. Mark calls up the company and the customer service representative's computer directs the representative to transfer the call to a fraud investigator. The fraud investigator gathers information from Mark and determines that the transaction was not fraudulent so the investigator reinstates the transaction and removes the scheduled January 4 cancellation. The fraud investigator computer 130 may also note the reinstated transaction as a false positive transaction. With this approach, the system 100 may efficiently detect false positives and the system 100 then may use the false positives to monitor the error rate of the fraud cancellation model 140 and replace the fraud cancellation model 140 to automatically keep up with the latest fraud trends.

The fraud detection server 135 may have a processor and memory configured to automatically suspend and schedule the cancellation of fraudrisk transactions that the fraud cancellation model 140 indicates to auto cancel. The fraud cancellation model 140 may include a fraud-score model and a fraud-score cancel-threshold. The fraud detection server 135 may cancel the fraudrisk transactions by communicating the suspensions and cancellation to the retail database 125. The fraud detection server 135 may store in the retail database 125 fraud determination attributes such as the fraud-score, the date of suspension, the scheduled date of cancellation and the actual date of cancellation of the transaction. The fraud detection server 135 may calculate an error rate that monitors a measurable aspect of the system 100 (as indicated below) and when the error rate gets above a preset limit then adjust the system to reduce the error rate, e.g. generate a new fraud cancellation model 140. For example, the fraud detection server 135 may calculate an error rate by dividing the number of false positives by the amount of auto canceled transactions. The fraud detection server 135 may monitor the error rate, and when the error rate exceeds a preset limit, for example 0.3%, then the fraud detection server 135 may start the process of generating a new fraud cancellation model 140, starting with generating a new fraud-score model that the fraud detection server 135 sends to the fraud manager computer 145.

Alternatively, the fraud detection server 135 could calculate a different error rate, for example, the amount of false positive fraud transactions relative to all of the fraud-transactions. Alternatively, the fraud detection server 135 may calculate the error rate based on the amount of customer complaints filed because of auto canceled transactions. In another exemplary approach the fraud detection server 135 could calculate the error rate based on the amount of fraud-transactions that were not auto canceled, taking the amount of total fraud-transactions less the auto-canceled transactions and dividing that amount by the total fraud-transactions. In yet another exemplary approach, the fraud detection server 135 could calculate the error rate based upon the amount of police identified fraud transactions that the fraud cancellation model 140 did not catch. In yet a different exemplary approach the fraud detection server 135 could calculate the error rate based on how the current fraud cancellation model 140 compares to a new fraud cancellation model 140, for example, a new fraud cancellation model 140 that is based on the latest fraud risk transactions in the retail database 125.

The fraud detection server 135 may periodically check the error rate. The fraud detection server 135 may wait for a trigger before it checks the fraud error rate again. The trigger may be a periodic time increment (for example, every 12 hours), a periodic daily schedule (for example at 8 AM and 2 PM), when a request is received (for example, from a fraud manager) or at some other trigger that is useful for improving the fraud cancellation process.

To create a new fraud cancellation model 140, the fraud detection server 135 may construct multiple fraud-score models using a statistical model generator process. See the '759 Application for a discussion of the process of constructing the various models and evaluating them to select the best fraud-score model.

The fraud detection server 135 may generate a new fraud cancellation model 140 with the latest fraudrisk transactions by generating multiple fraud-score models using transaction attributes as inputs. The latest fraudrisk transactions create an initial modeling dataset and may be a subset of all the transactions, specifically those transactions that have fraudrisk attributes. The fraud detection server 135 may identify fraudrisk transactions with the fraud models 120 attributes, by another fraudrisk attribute from other fraudrisk identifying processes (such as the Fraud Profile Data, FPD, discussed below), by fraudrisk attributes received from a fraud investigator, by fraudrisk attributes received from another organization such as law enforcement or with fraudrisk attributes obtained by some other related means. All of the attributes and columns in the database 125 associated with the fraud risk transactions may make up the initial modeling dataset.

The fraud detection server 135 may use the initial modeling data set to create bins that are groups of transactions sharing one or multiple attribute values. The fraud detection server 135 uses these data bins and finds the bins that are statistically associated (either positively or negatively) with fraud-transactions. These bins are used in the statistical model generation process to construct various fraud-score models, see the '759 application for details.

The fraud detection server 135 may evaluate the multiple fraud-score models using recent fraud-risk transactions from the retail database 125 to produce an analysis of the model's projected performance called model performance information. The model performance information may include a gains plot, a demi-decile table and an error rate table, which are described in more detail below.

The fraud detection server 135 may use the model performance information to find the fraud-score model that most accurately predicts fraud-transactions. For example if the fraud-score is the probability of a transaction being fraudulent and when the fraud-score model is run on recent fraud-transactions from the retail database 125 the higher the predicted probability, i.e. fraud-score, is on fraud-transactions the better the model is. If several models predict the highest fraud-score, e.g. 100% probability of a transaction being a fraud-transaction, then the fraud detection server 135 may select the fraud-score model that accurately identifies the most fraud-transactions with a maximum fraud score, e.g. 100% probability of being fraudulent, i.e. the fraud detection server sees how many fraud-transactions have a projected fraud probability of 100%.

Once the fraud detection server 135 has identified the fraud-score model to use, then the fraud detection server 135 may send the fraud score model along with the model performance information to the fraud manager computer 145.

The fraud manager computer 145 may have a processor and memory configured to receive the fraud-score model and the model performance information and determine a fraud-score cancellation threshold. A process, a person (such as a fraud manager), or a combination of a process and a person may carry out the review of the model performance information to determine the fraud-score cancel-threshold. The fraud manager computer 145 may determine the fraud-score cancel-threshold based in part on an objective to achieve a specific resource usage or a specific quality rate. For example, as specific resource usage may be to reduce the number of fraud investigations by a specific number, as discussed in more detail below. The new fraud-score model and the fraud-score cancel-threshold make up a new fraud cancellation model 140. The fraud manager computer 145 sends the new fraud cancellation model 140 to the fraud detection server 135 to install and use.

In general computing systems and/or devices, such as the ordering device 105, the transaction server 115, the fraud detection server 135, the fraud investigator computer 130 and the fraud manager computer 145, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a cloud computer, a desktop, notebook, laptop, or handheld computer, a cell phone, or some other computing system and/or device.

Computing devices generally include computer-executable instructions, where the instructions may be executable by one or more computing devices such as those listed above. Computer-executable instructions may be compiled or interpreted from computer programs, for example, SAS® from SAS Institute of Cary, N.C., created using a variety of programming languages and/or technologies, including, without limitation, and either alone or in combination, SAS® language, C, C++, C#, Java™, Visual Basic, Java Script, Perl, Python, PHP etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB drive any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Databases, data repositories or other data stores described herein, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language.

FIG. 2 is an exemplary transaction chart 200 showing fraudrisk transactions with some example attributes. The chart has the following attributes or columns: "Transaction ID," "Who," "What," "FraudModel5_," "FraudModel6_Hit," "FraudModel7_Hit," "FraudModel8_Hit," "FPD_EMAIL," "FPD_IP," "FPD_SSN," and "ORDER_AMT."

Each row of the chart is a transaction, and the "transaction ID" column holds the transaction's unique identifier. The next column, "Who," is an example of a customer attribute, where the "Who" column contains the name of the person that placed the order and started the transaction. The next column, "What," is an example of an order attribute that contains information about what was ordered. The next seven columns are fraudrisk attributes, specifically "FraudModel5_Hit," holds the results of fraud model five 120 that is running on the transaction server 115. Similarly "FraudModel6_Hit," "FraudModel7_Hit" and "FraudModel8_Hit" columns contain results from fraud models six, seven and eight 120 respectively. "FPD_E-MAIL," "FPD_IP" and "FPD_SSN" contain results of checks against the Fraud Profile Definition (FPD), where the FPD holds indicators of fraud from past fraud-transactions. For example if "FPD_EMAIL" is "1" that indicates true and means the email of the transaction fit the FPD email profile, either matching a specific email or matching an email addresses pattern associated with fraud. Similarly, "FPD_IP" has a profile pattern related to IP address from the network attributes, associated with fraud. Finally, "FPD_SSN" has a profile pattern related to SSN and/or SSN patterns associated with fraud. The fraud detection server 135 may construct the FPD using prior fraud-transactions from the retail database 125. The final column holds another order attribute, namely the "ORDER_AMT," which contains the dollar amount of the order.

The first row in chart 200 illustrates a transaction ID of 1 to Joe for the purchase of a new phone. Joe's transaction was flagged, with a "1" indicating true, by fraud model five 120 as being a fraudrisk, and likewise flagged by fraud models six, seven and eight 120 as being a fraudrisk as well. In addition, Joe's transaction was flagged by the fraud detection server 135 as fitting the Fraud Profile Definition (FPD) in regards to the transaction having an email address, an IP address and a Social Security number that fit the profile and thus indicated fraud. And the final column order amount was $185. So Joe's transaction has many indications of being a fraudulent transaction.

The second row in chart 200 illustrates a transaction to Jane for the purchase of a new phone. Unlike Joe's transaction Jane does not meet the criteria for fraud model five 120, being that "FraudModel5_Hit" column contains a "0," nor does Jane's transaction's fit fraud models six's filter, but Jane's transaction is indicated by fraud model seven 120 as being a fraudrisk and likewise is indicated by fraud model eight as being a fraudrisk. In addition, Jane's transaction fits the FPD for the email, IP and Social Security number. Finally, the amount of the transaction is indicated as $132. So Jane's transaction has fewer indicators of fraud than Joe's transaction.

The third transaction to Sally looks much better, from a fraud perspective, because Sally's transaction does not fit in any of the fraud models 120 and is only flagged by the FPD as having a Social SSN associated with fraud. So Sally's transaction looks to have less fraudrisk then Joe's or Jane's. One can similarly analyze the remaining fourth and fifth rows for their potential to be fraudulent.

FIG. 3 is a bin detail chart 300 that illustrates an exemplary initial list of bins to potentially use as inputs to the statistical model generator process (i.e. generate fraud-score models). The chart 300 takes the attribute/columns from chart 200 and presents them as rows and adds additional selection criteria to use as filters on a set of transactions. The system 100 can use the bin's selection criteria on a set of transactions from the retail database 125, for example see chart 200, to isolate a set of related transactions. A bin is a collection of transactions that share a common attribute value or attribute range. For example, a bin could be composed of all transactions with an order amount between $100 and $200, which looking at chart 200 would select transactions "1," "2," "3" and "5" because their amounts are $185, $132, $150 and $125 respectively.

Chart 300 has columns "Model Variable," "Attribute Name," "Value Bin," "Attribute Value," "Min Attribute Value," "Max Attribute Value," "Fraud Count," "Total Count," "Pct. Fraud of Attribute" and "Pct. of Total Fraud."

The column "Model Variable" holds the name of the bin that is input to the statistical model generating process. The column "Attribute Name" contains the name of the attribute/columns in the retail database 125.

The column "Value Bin" is a grouping of bins. The fraud detection server 135 may perform a variable reduction step while doing the binning process, where related bins are grouped together into "Value Bins." In this specification the "Value Bin" identifies related bins—that is bins that have similar attributes—for example a similar number of fraud counts and other shared or similar attributes values. For example, if one bin was related to emails from site.xyz and another bin was related to emails from site2.xyz and they both flagged about three hundred transactions then both those bins might be given the same value bin, for example "1." By associating related bins the number of value bins can be limited to a smaller count than the total amount of bins, for example four or five value bins. The fraud detection server 135 may use the grouping of bins into value bins to improve the efficiency in the statistical modeling while retaining the effectiveness of the statistical modeling.

The next 3 columns "Attribute Value," "Min Attribute Value" and "Max Attribute Value" hold the filter criteria. The chart 300 holds the filter criteria for a bin in either in the "Attribute Value" column or in the "Min Attribute Value" and "Max Attribute Value" columns, depending on if the attribute holds a discreet or continuous value respectively. An example of a discrete value would be integers (0 or 1) or strings and an example of continuous values would be real numbers (for example 101.25).

The "Total Count" indicates the number of transactions, in this exemplary case the number of fraudrisk transactions from the retail database 125 for the last 30 days, that meet this bins filter criteria. The "Fraud Count" indicates the number of fraud-transactions, that is, the number of transactions that the system 100 has determined are fraudulent. The "Pct. Fraud of Attribute," is a percent of transactions in this bin that are fraud-transactions, calculated as the "Fraud Count" divided by the "Total Count." The "Pct. Of Total Fraud," is the percentage of fraud-transactions that this bin's filter criteria selects of all the fraud-transactions in the entire dataset.

As illustrated, the "fraud_model_5_hit_bin2" has an attribute name of "FraudModel5_hit" and has a "Attribute Value" of zero, indicating the bin contains the group of transactions that were not flagged for being a fraudrisk by fraud model five 120. There were a total of 5,818 fraudrisk transactions (both fraud-transactions and non fraud-transactions) of the set of fraudrisk transactions in the retail database 125 from the last 30 days that met the "Fraud_Model_5_Hit_Bin2" bin's filter criteria. Of the 5,818 transactions, 2,148 were fraudulent (fraud-transactions) or 36.92%, where the 2,148 transactions represent 49.93% of all the fraud-transactions in the dataset.

The next two rows, "Fraud_Model_5_Hit_bin2" and "Fraud_Model_6_Hit_bin2," are very similar to the first row except reporting about fraud model five and six 120. The first 3 bins are in the same value bin, "2." The next row, "Fraud_Model_7_Hit_bin2," is in a different value bin, "1," and is different from the first three rows because the "Attribute Value" is "1" indicating this bin contains all those transactions that fraud model eight 120 flagged as being a fraudrisk. For this row there were only 922 transactions from the set of transactions that met the filter criteria of fraud model eight 120 as being a fraudrisk and of those 922 transactions 80.48% of them were fraudulent, i.e. 742 fraud-transactions. The 742 fraud-transactions represent 17.25% of the fraud-transactions in the dataset. The next three bins, "FraudProfileData_EMAIL_bin2," "FraudProfileData_IP_bin2" and "FraudProfileData_SSN_bin2," all have an attribute value of zero, indicating these are transactions not flagged as being consistent with the Fraud Profile Data. Also, these three bins were also included in the same value bin as the first 3 rows. Value bin "2" groups bins with the total count being consistently above 5800 and the percent of fraud being around 40%.

The last row "ORDER_AMT_bin1" has a filter selecting all those fraud risk transactions that have order amounts between $100 and $200, where the 100 comes from the "Min Attribute Value" column and the 200 comes from the "Max Attribute Column." Value bin "1" groups "ORDER_AMT_bin1" and "Fraud_Model_8_Hit_bin1" that both have counts fewer than 4,900 and a percent of fraud attributes above 50%.

FIG. 4 is an exemplary bins statistics chart 400 that illustrates the statistical relationship of bins to fraud-transactions. Each row corresponds to a bin. The first column is the "Model Variable" that holds the name of the bin that is input to the statistical model generation process, which matches the "Model Variable" from chart 300. The "estimate" column provides an estimate of the statistical correlation that a transaction in this bin will be fraudulent, that is, a fraud-transaction. The estimate for correlation can be positive, indicating presence in this bin increases the chance that the transaction is a fraud-transaction, or can be negative, indicating presence of a transaction in this bin decreases the chance of the transaction being a fraud-transaction.

The final column in chart 400 is "ProbChiSq," which is the statistical attribute Probability Chi Squared, also known as the p-value. Chi Squared is a measure of how statistically significant a statistical correlation is. Often people use a Chi Squared value of less than 0.05 to establish statistical significance. In the example bin statistics chart 400 all the "ProbChiSq" values are less than 0.0001 so the fraud detection server 135 may consider the estimated correlation statistically significant and the fraud detection server 135 may consider all the bins good inputs for the statistical model generation process. If the Chi Squared was above a threshold, e.g. 0.05, then that bin would fail to be statistically significant, and the fraud detection server 135 may not use the bin as input to the statistical model generation process.

As illustrated, the Fraud_Model_5_Hit_bin2 has an estimated statistical relationship of −0.883 indicating that a transaction in this bin, i.e. not flagged by fraud model five 120 as being a fraudrisk, indicates the transaction is less likely to be a fraud transaction. The next bin Fraud_Model_6_Hit_bin2 has a stronger negative correlation at −1.1786, again indicating that if fraud model six 120 did not indicate this transaction was at fraudrisk, then the transaction was less likely to be a fraud-transaction. Fraud_Model_7_Hit_bin2 is similar to the first two bins. Fraud_Model_8_Hit_bin2 holds those transactions that were flagged by fraud model eight 120 as being at risk of being fraudulent and this bin is positively correlated at 0.8615 with the transaction in this bin being a fraud-transaction. The next three bins, "FraudProfileData_EMAIL_bin2," "FraudProfileData_IP_bin2," and "FraudProfileData_SSN_bin2" (transactions that were not correlated with the fraud profile email data, IP data and SSN data respectively), have very strong negative correlation with fraud-transactions with an estimated correlation of −5.6531, −6.0698 and −5.3302 respectively. The final bin "ORDER_AMT_bin1," which holds all those transactions with orders between $100 and $200, has a positive correlation to fraud-transactions with an estimated correlation of 0.4861.

FIG. 5 is a demi-decile chart 500, which is an example demi-decile table for a particular fraud-score model run against the dataset of fraudrisk transactions from the retail database 125 for the last 30 days. In this case, the fraud score model predicts a fraud probability. The chart 500 shows actual fraud probabilities for 5% subsets of the dataset, i.e. demi-deciles, with predicted fraud values for comparison. The columns of the demi-decile chart 500 are "Demi-decile," "Cumulative % of data-set," "Total samples in demi-decile," "Total Fraud in demi-decile," "Cumulative Total Fraud," "Average Predicted Fraud Probability," "Minimum Predicted Fraud Probability," "Maximum Predicted Fraud Probability," "% Fraud in Demi-decile," "Cumulative % Fraud in Demi-deciles," "% Total Fraud," "Cumulative % Fraud," "Lift" and "Cumulative Lift."

The "Demi-decile" column holds the demi-decile group number. The first row of chart 500 holds the first demi-decile group, labeled "0," which holds the transactions with the highest probability of fraud as ranked by the fraud-score from the fraud-score model. The "Cumulative % of data-set" indicates how much of the dataset has been covered in this and all demi-decile rows above. The "Total samples in demi-decile" indicates the total number of fraudrisk transactions in this demi-decile group. The "Total Fraud in demi-decile" indicates the total number of fraud-transactions in this demi-decile group. The "Cumulative Total Fraud" indicates the total number of fraud-transactions in this and all the demi-decile rows above.

The "Average Predicted Fraud Probability" indicates the average fraud probability generated by the fraud-score model for all the transactions in this demi-decile row. The "Minimum Predicted Fraud Probability" indicates the minimum fraud probability generated by the fraud-score model for a transaction in this demi-decile group. The "Maximum Predicted Fraud Probability" indicates the maximum fraud probability generated by the fraud-score model for a transaction in this demi-decile group.

The "% Fraud in Demi-decile" is the "Total Fraud in demi-decile" divided by the "Total Samples in demi-decile." The "Cumulative % Fraud in Demi-Deciles," is the "Cumulative Total Fraud" divided by the cumulative total samples in the demi-deciles. The "% Total Fraud" the total fraud in the demi-deciles divided by the total fraud-transactions in the entire dataset (4,302 as shown at the bottom of demi-decile chart 500). The "Cumulative % Fraud" is the "Cumulative Total Fraud" divided by the total fraud-transactions in the entire dataset, i.e. 4,302.

The "Lift" column indicates how much better this demi-decile group is at gathering fraud-transactions than if the transactions in the dataset were just randomly sorted into demi-decile groups. Lift provides an indication, given a set of data, of how much better a particular way of grouping the items is than a random grouping of items in the set. A lift of 1 would mean the grouping has as much likelihood of happening as a random grouping. The fraud detection server 135 may calculate lift by taking the amount of fraud-transactions in the demi-decile and dividing it by the number of fraud-transactions expected to be found in a demi-decile if the transactions were randomly distributed. Demi-decile "0" should expect 215 fraud-transactions calculated by taking 44% (the percent fraud in the entire dataset) and multiplying it by the 489 transactions in the demi-decile "0" group. But, in reality, demi-decile "0" actually has 487 fraud-transactions. Taking the 487 'actual' and dividing by the 215 'expected' results in a 2.27 lift, indicating that this demi-decile group has lifted the probability to be 2.27 times more likely than average to have fraud-transactions. The "Cumulative Lift" is the "Total Fraud" divided by what would be expected if the fraud-transactions were randomly distributed, calculated in the same manner just described.

The demi-decile chart 500 illustrates that the predicted fraud probability matches closely to the actual fraud in the demi-decile. Chart 500 shows the "Average Predicted Fraud Probability" column and the "Percent Fraud in Demi-decile" match in most rows and when they don't match they are within at 4 percentage points. Chart 500 shows the first two demi-decile rows has the percent fraud that rounds up to 100%. This indicates that when the fraud-score model generates a fraud-score of 100% it is remarkably accurate, nearly 100% accurate, at predicting fraud-transactions.

As illustrated, the third row holds demi-decile "2," or 5% of the dataset, between the top of the 15% and the top 10% risk of being fraudulent. There are 490 fraudrisk transactions in demi-decile "2" with 79% of those or 370 transactions being fraud-transactions. This plus all the rows above accounts for 1,346 fraud-transactions. To get in this demi-decile the fraud score model would have had to predict a fraud score from 58% to 100%, and the fraud score model predicts 76% of the transactions in this demi-decile will be fraud-transactions. 92% of the transactions in the first three demi-decile rows are fraud-transactions, which represents 31% of all the fraud in the dataset. The 370 fraud-transactions represent 8.6% of all the fraud in the dataset. This demi-decile has a lift of 1.72, that is, this group of transactions is 1.72 times more likely to contain fraud-transactions and a random grouping. Cumulatively the first 3 rows have a lift of 2.09, or about double the amount of fraud-transactions are found in the first three demi-deciles than would be expected if the transactions were randomly distributed. So this fraud-score model is good at identifying the fraud-transactions based on the incoming transaction's attributes, as verified by the results of the fraud investigations and false positives that are reflected in the list of fraud-transactions.

FIG. 6 is an error rate chart 600 that is an excerpt of an error rate table that shows the predicted fraud probability, i.e. fraud-score, and cumulative false positive error rate using fraudrisk transactions from the database 125 for the past 30 days. The columns provided in chart 600 are as follows: "Fraud Score Threshold," "Total," "Cumulative Total Orders," "Cumulative Orders per Day," "Total Fraud," "Cumulative Total Fraud," "Total False positives," "Cumulative false positives," and "Cumulative Error Rate."

The "Fraud Score Threshold" is the fraud-score produced by the fraud-score model, e.g. fraud prediction probability. The first row has a fraud-score of 1, i.e. 100%, that predicts that the transaction will be a fraud-transaction. As the rows continue the fraud-score decreases, where the second row has a probability is 0.9999, i.e. a 99.99% chance, that the transaction will be a fraud transaction. The probability drops as you go down the chart ending at the bottom of the chart with only a 46.00% chance that the transaction will be a fraud-transaction.

The "Total" is the total amount of transactions with this fraud-score threshold or higher that did not exceed the fraud-score threshold of the above row. The "Cumulative Total Orders" is the cumulative total amount of fraud-transactions of this row and all the rows above. The "Cumulative Orders per Day" is the orders per day that setting the fraud-score threshold at this level would include, on average given this dataset.

The "Total Fraud" is the actual amount of transactions in this row that are fraud-transactions. The "Cumulative Total Fraud" is the total amount of actual transactions in this row and the rows above that are fraud-transactions. The "Total False positives" is the difference between the "Total" transactions in this row and the "Total Fraud" transactions, in other words the transactions that were flagged as being fraudulent by the fraud cancellation model 140 with this row's fraud-score threshold that actually were not fraud-transactions. The "Cumulative False positives" holds count of the amount of false positives from this row and all the rows above. The "Cumulative Error Rate" is the "Cumulative False Positives" divided by the "Cumulative Total Orders."

The error rate chart 600 can help establish the fraud-score cancellation-threshold to achieve various objectives. If the desire is to reduce the number of fraud investigations that the fraud investigators need to perform by 15 investigations a day, then the fraud detection server 135 may cancel all transactions with a fraud-score of 0.9989. Because, looking at the row with the fraud-score threshold of 0.9989 the "Cumulative Orders per Day" column indicates 15.1 transactions. So, by setting the fraud-score cancel-threshold to 0.9989 and suspending in scheduling those transactions for cancellation, without an investigation, it would save the fraud investigators about 15 investigations per day.

The objective may be to achieve a specific resource usage, for example, reduce the amount of investigations that the fraud investigators have to do by about 60 transactions a day, then looking at the row starting with the threshold of 0.5807 and going to the "Cumulative Orders per Day" column it is predicted that 60.73 transactions could be canceled at that fraud-score cancel-threshold. But, a threshold of 0.5807 would also result in 275 false positives and a 15% error rate. If the desire is to have the error rate no higher than 5%, then the fraud-score cancel-threshold could be set to about 0.6684 which should result in an error rate of about 5.3%.

If instead the objective is to achieve a specific quality rate, for example, an error rate of 2% or less then the fraud-score cancel-threshold could be set to 0.7662 in which case the system 100 could avoid about 40 fraud investigations per day, but about 24 false positives would occur. If the fraud detection server 135 raised the fraud-score cancel-threshold up to 0.7676 it could result in nearly the same number of canceled transactions, 39, but that small change in the threshold nearly cuts in half false positives to only 14. If the fraud detection server 135 raised the fraud-score cancel-threshold still further to 0.8194, then still about 39 transactions could be auto-canceled without investigation, but the amount of false positive transactions could be dropped down to only 4 for an error rate of 0.35%. This demonstrates how useful the information in the error rate table is when determining the fraud-score cancel-threshold, and how system 100 can use the error rate table information to set the fraud-score cancel-threshold based on an objective.

The error rate table, e.g. chart 600, numbers may be based on the historical fraudrisk transactions, e.g. the past 30 days. The quantity of historical fraud risk transactions to include is set to an appropriate threshold (e.g., number or time based) that will capture the latest fraud techniques that are being perpetrated on the organization and yet be long enough to provide a statistically significant pool of transactions so the that error rate will not be fluctuating just because of the randomness of the data. Experience has shown that an approximate one-month time window may be appropriate. The quantity of historical fraud risk transactions to include is set to an appropriate threshold (e.g., number or time based) that will capture the latest fraud techniques that are being perpetrated on the organization and yet be long enough to provide a statistically significant pool of transactions so the that error rate will not be fluctuating just because of the randomness of the data. Experience has shown that an approximate one-month time window may be appropriate. When the fraud detection server 135 puts the fraud cancellation model 140 into production the actual counts will differ from the projections, but it is likely to be close to the predicted performance based on how strong the statistics are and based on real-world experience. Real-world experience has shown that the performance of the fraud cancellation model 140 correlates well with the model performance information.

Figure 7:
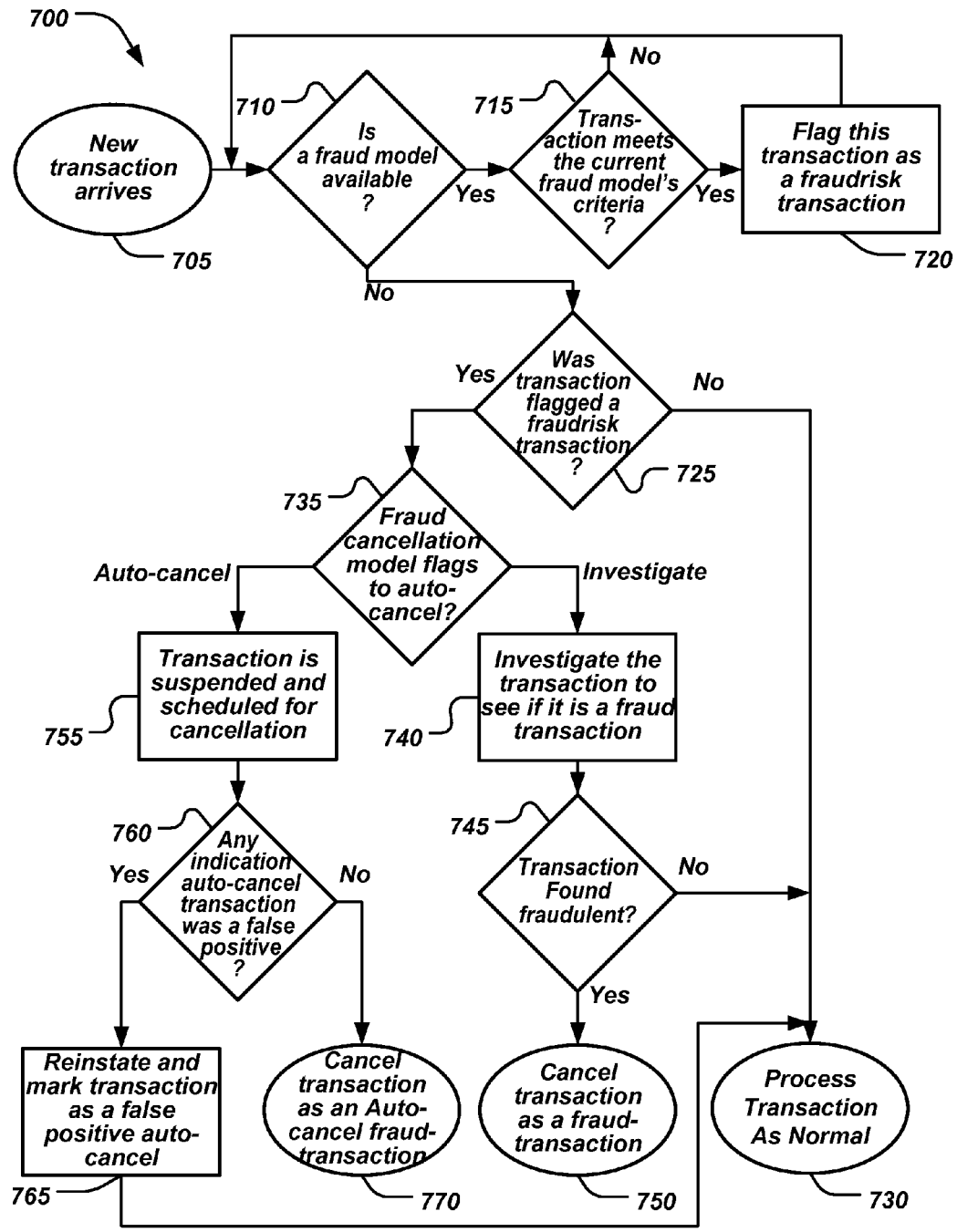
FIG. 7 is a flowchart of an exemplary process that may determine a transaction's fraud disposition information.

FIG. 7 is a flowchart illustrating how a transaction's fraud disposition is established in an exemplary approach. The system 100 may implement process 700, for example on the transaction server 115 the retail database 125, the fraud investigator computer 130 and the fraud detection server 135.

At oval 705, a new transaction arrives at the transaction server 115.

At decision diamond 710, the transaction server 115 may check if there is a fraud model 120 available. If there is no fraud model 120, or no new fraud models 120 to run against the transaction, then the transaction server 115 may proceed to decision diamond 725. If there is a fraud model 120 available then the transaction server 115 may select that fraud model 120 and make it the current fraud model 120 and may proceed to decision diamond 715.

At the decision diamond 715, the transaction server 115 may determine if the transaction meets the current fraud model's 120 filter criteria. If the transaction fails to meet the current fraud model's filter criteria then the transaction server 115 may return to the decision diamond 710. If the transaction meets the current fraud model's filter criteria the transaction server 115 may continue to block 720.

At the block 720, the transaction server 115 may signal the retail database 125 that the transaction meets the filter criteria of the current fraud model 120 and should be flagged a fraudrisk transaction. The transaction server 115 may continue back to the decision diamond 710 to determine if there are more fraud models 120 to test the transaction against. When the transaction server 115 determines there are no more fraud models 120 then the transaction server 115 has completed processing the transaction.

At the decision diamond 725, the fraud detection server 135 may check to see if the transaction was flagged a fraudrisk by at least one fraud model 120. If the transaction was not flagged a fraudrisk transaction then the fraud detection server 135 may proceed to oval 730. At the oval 730, the transaction is ignored by the fraud detection server 135 and processes normally. If the transaction was flagged a fraudrisk transaction than the fraud detection server 135 may proceed to decision diamond 735.

At the decision diamond 735, the fraud detection server 135 may determine if the fraud cancellation model flags the transaction for auto cancellation. If the transaction is not flagged for auto cancellation, but instead for investigation, then the fraud detection server 135 may continue at block 740. If the fraud cancellation model 140 indicates the transaction should be auto canceled then the fraud detection server 135 may continue at block 755.

At the block 740, the system 100 may investigate the transaction to see if it is a fraud-transaction.

At decision diamond 745, the fraud investigator computer 130 will take the results from the fraud investigation and if the transaction was not a fraud-transaction then the process 700 may continue at the oval 730 for the transaction to process normally. If the fraud investigation determined the transaction was a fraud-transaction then the fraud investigator computer 130 may continue at oval 750.

At the oval 750, the fraud investigator computer 130 may notify the retail database 135 that the transaction is to be canceled and labeled a fraud-transaction.

At the block 755, the fraud detection server 135 may notify the retail database 125 that the transaction is to be suspended, scheduled for cancellation and labeled an auto cancel transaction.

At decision diamond 760, the fraud detection server 135 may determine that the auto cancel transaction was a false positive, for example a communication from the customer that convinces a fraud investigator that the transaction was not fraudulent. If the transaction is a false positive then the fraud detection server 135 may proceed to block 765. If there is no indication that the auto cancel transaction was a false positive then the process 700 may continue at oval 770.

At the oval 770, when the scheduled time for the cancellation of the auto cancel transaction has arrived, and the retail database 125 may remove the suspension and permanently cancel the transaction.

At the box 765, the fraud investigator computer 130 can notify the retail database 125 that the transaction is to be unsuspended and the scheduled cancellation terminated because it was a false positive and is to be marked a false positive. The process 700 may continue at the oval 730 where the transaction may process as a normal transaction.

Figure 8:
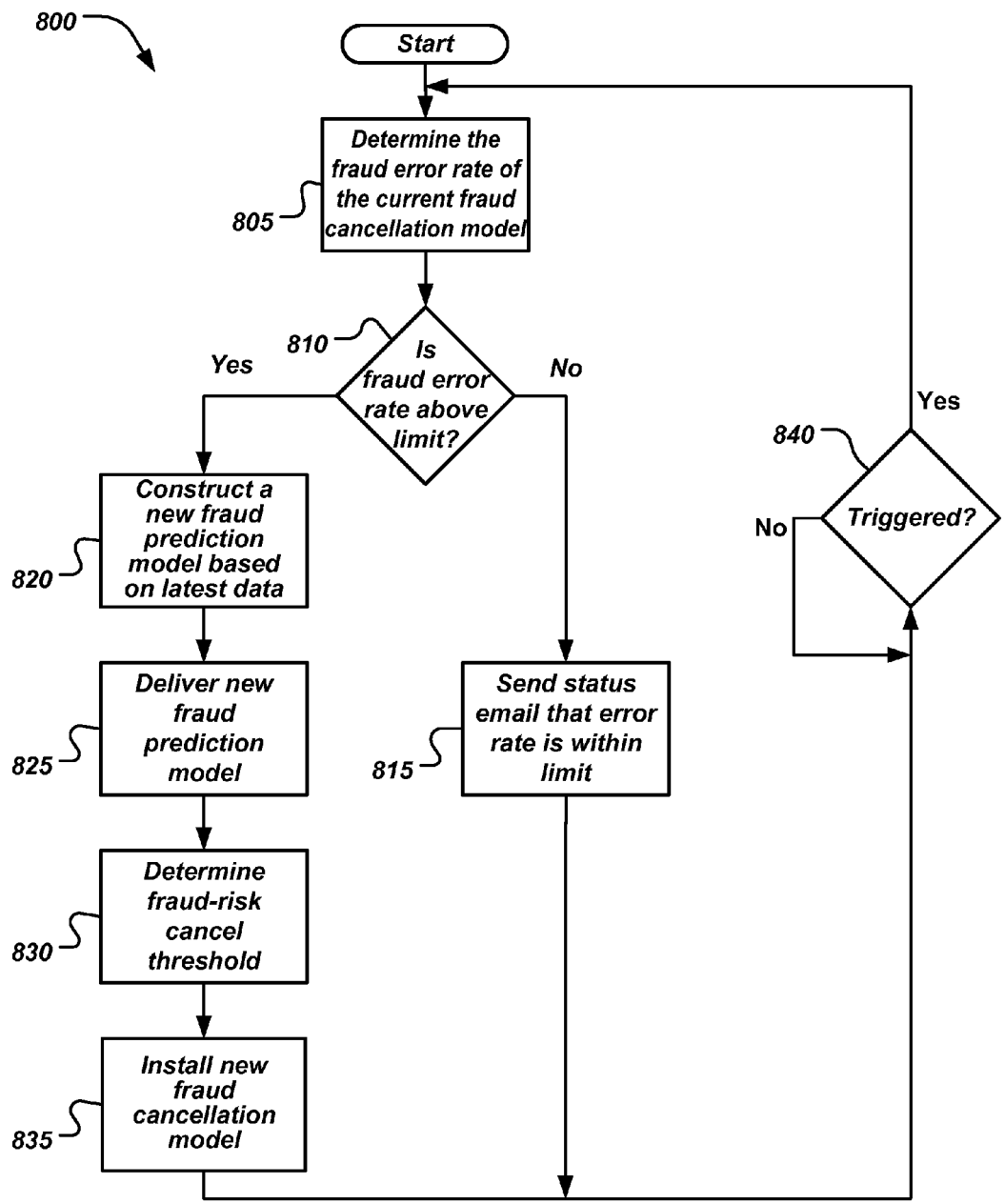
FIG. 8 is a flowchart of an exemplary process that may continuously monitor and improve a fraud cancellation model.

FIG. 8 is a flowchart of an exemplary process 800 that the system 100 may use to continuously monitor and improve fraud cancellation. The system 100 may implement process 800, for example on fraud detection server 135, the retail database 125, the transaction server 115, the fraud investigator computer 130 and the fraud manager computer 145, or some combination thereof.

At block 805, the fraud detection server 135 may determine the fraud error rate of the current fraud cancellation model 140.

At decision diamond 810, the fraud detection server 135 may determine if the fraud error rate exceeds the error rate limit. If the fraud error is below the error rate limit then the error rate is good and the fraud detection server 135 may proceed to block 815. If the fraud error rate exceeds the limit, indicating poor performance, then the fraud detection server 135 may proceed to block 820.

At the block 815, the fraud detection server 135 may communicate to the fraud manager computer 145 that the fraud cancellation model 140 is performing within allowed limits.

At the block 820, the fraud detection server 135 may create a new fraud-score model based on the latest fraudrisk transaction data as described above. The fraud detection server 135 may generate model performance information about the predicted performance of the fraud-score model using the fraudrisk transactions from the retail database 125.

At block 825, the fraud detection server 135 may send the new fraud-score model along with model performance information to the fraud manager computer 145.

At block 830, the fraud manager computer 145 may review the model performance information for the new fraud-score model and determine a fraud-score cancel-threshold to complete the new fraud cancellation model 140.

At block 835, the fraud manager computer 145 may send a new fraud cancellation model 140 to the fraud detection server 135. The fraud detection server 135 may receive the new fraud cancellation model and install it as the new current fraud cancellation model 140.

At block 840, the fraud detection server 135 may wait for a trigger to check the fraud error rate again.

Figure 9:
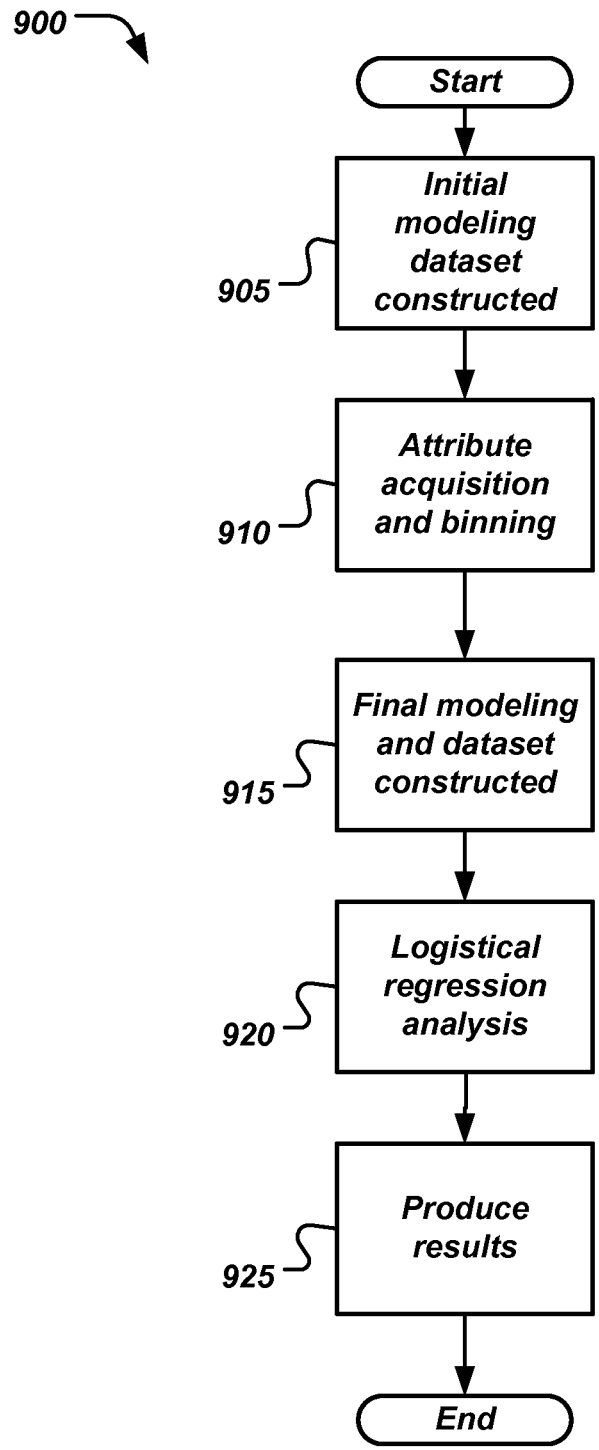
FIG. 9 is a flowchart of an exemplary process that may generate a fraud-score model.

FIG. 9 illustrates an exemplary process 900 that may be implemented by the system 100 to generate a fraud-score model 140. The process 900 may be implemented by various components of system 100 such as the fraud detection server 135.

At block 905, the fraud detection server 135 may construct the initial modeling dataset of transactions from the retail database 125.

At block 910, the fraud detection server 135 may identify an initial modeling dataset and attributes associated with transactions that correlate, either positively or negatively, with fraud-transactions.

At block 915, the fraud detection server 135 may do the binning of the attributes, including fraud model hits, to create and identify the most statistically relevant bins. The fraud detection server 135 may output a bin report and a bin statistics report. Chart 300 is an example of the bin report. Chart 400 is an example of the bin statistics report.

At block 915, the fraud detection server 135 may use the bins with statistical correlation to fraud-transactions, e.g. those bins in the table 400 with Chi Squared values below 0.05, to create a modeling dataset.

At block 920, the fraud detection server 135 may construct various fraud-score models. The fraud detection server 135, using the fraudrisk transactions from the retail database 125 and the bins may use the statistical model generator process to generate a set of fraud-score models, see the description above and the '759 application. From the predicted performance information the fraud detection server 135 may select the best fraud-score model.

At block 925, the fraud detection server 135 may analyze the new fraud-score model using the fraudrisk transactions from the retail database 125 to predict the performance of the fraud-score models and produce predicted model performance information to help finalize the fraud cancellation model 140, namely a gains plot, a demi-decile table, an error rate table and production SQL. Chart 500 is an example of a demi-decile table. Chart 600 is an example of an error rate table.

FIG. 10 is an exemplary transaction chart 1000 of transactions with fraud disposition information. The chart has the following columns: "Who," "What," "FraudModel5_Hit," "FraudModel6_Hit," "FraudModel7_Hit," "FraudModel8_Hit," "FPD_EMAIL," "FPD_IP," "FPD_SSN," "ORDER_AMT," "Fraud Score," "Auto canceled," "False Positive," and "Fraud."

The following columns were discussed above: "Transaction ID," "Who," "What," "FraudModel5_Hit," "FraudModel6_Hit," "FraudModel7_Hit," "FraudModel8_Hit," "FPD email," "FPD_IP," "FPD_SSN," and "Order Amount."

The "Fraud-score" holds this transaction's the fraud-score from the fraud-score model. The number ranges from 0 to 1, which may indicate the probability that the transaction is a fraud-transaction. The "Auto canceled" column indicates whether the fraud detection server 135 auto canceled this transaction because the fraud cancellation model 140 indicated it was a fraud-transaction. The "False Positive" column indicates for an auto cancel transaction whether or not ultimately that transaction was found to be not fraudulent. The final column "fraud" indicates whether the system 100 determined the transaction was a fraud-transaction.

For this example, the fraud detection server 135 had the fraud-score cancel-threshold set at 90%. For the first transaction to Joe has a fraud-score model generated fraud-score of 100%, and the fraud cancellation model 140 indicated to cancel the transaction because the fraud score was above the 90% fraud-score cancel-threshold. The transaction is not a false positive because while the transaction was scheduled for cancellation no indication was received from the customer that the transaction was not fraudulent. Finally, Joe's transaction is a fraud-transaction, indicated by the "Yes" in the "Fraud" column.

For the second transaction to Jane with a fraud-score of only 40%, the fraud cancellation model 140 indicated to not auto cancel the transaction, although the fraud model 120 results may have resulted in a fraud investigation. Therefore, the auto cancel column is set to "No" and the "False Positive" column contains a dash indicating a null, i.e. the column is not applicable since the transaction was not auto canceled. The "Fraud" column has a "Yes" indicating Jane's transaction was determined to be a fraud-transaction after a fraud investigation.

The third transaction to Sally only garnered a fraud-score of 10% so the transaction was not auto canceled and the "False Positive" column is irrelevant. Ultimately the fraud investigation did not find the Sally's transaction to be a fraud-transaction, so the "Fraud" column says "No" indicating the transaction was not a fraud-transaction.

The fourth transaction to Mark scored a high fraud score of 99.94%, so the transaction was auto canceled. But, Mark communicated to the system 100 and it was determined that the transaction was not fraudulent so Mark's transaction was reinstated by putting a "No" in the "Fraud" column and indicating that the transaction was a false positive with a "Yes" in the "False Positive" column.

Similarly, the last transaction to Zack follows the pattern seen by Jane's transaction.

Although this specification has given the fraud-score example of fraud probability, fraud-score does not have to be fraud probability. The fraud-score could be any numeric ranking, other ranking or score generated by a fraud-score model that provides information that can be used to determine if the transaction is a fraud-transaction that should be canceled.

Because, the fraud cancellation model 140 can accurately cancel fraudulent transactions, the system 100 may reduce the communicating of cancellation decisions to other people, systems, departments and organizations, thus saving time, money and attention on canceling transactions that do not generate revenue.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed as new and desired to be protected by Letters Patent of the United States is:

1. A computing device comprising a processor and a memory configured to automatically suspend and schedule cancellation of fraudrisk transactions by executing a software application on a processor of the computing device to provide operations comprising:
   receiving, from a database, a first dataset indicating a quantity of fraud-transactions, the first set of data generated at least in part by a fraud-score model;
   receiving, from the database, a second dataset indicating a quantity of false positive fraud-transactions from the fraud-transactions;
   transforming, by the processor, the first dataset and the second dataset into a fraud error rate;
   comparing the fraud error rate with a predefined error rate;
   generating, by the processor, in response to the error rate exceeding the predefined error rate, a new fraud-score model by:
      constructing an initial modeling dataset of transactions, each having at least one transaction attribute, received from the database;
      generating at least one bin from the initial modeling dataset to group at least a subset of the transactions having common transaction attributes; and
      generating a modeling dataset based on the at least one bin and a statistical correlation to fraud-transactions;
   determining a fraud cancellation model that includes the fraud-score model and a fraud-score cancel-threshold in response to a review of the new fraud-score model evaluated using pre-existing transaction data; and
   using the new fraud cancellation model to evaluate a set of transactions and determine whether each of the transactions is a fraud-transaction.

2. The computing device of claim 1, wherein the fraud-score cancel-threshold determined in response to the review is selected to achieve a specific objective related to at least one of a resource usage and a quality rate.

3. The computing device of claim 1, further configured to execute the software application to provide operations comprising receiving additional first and second datasets and calculate a subsequent fraud error rate based on the additional datasets to determine whether to generate the new fraud-score model.

4. The computing device of claim 1, wherein generating the new fraud-score model uses a set of fraudrisk transactions to generate the new fraud-score model, wherein the set of fraudrisk transactions is a subset of a total set of transactions.

5. The computing device of claim 1, wherein generating the new fraud-score model includes generating multiple fraud-score models and selecting the best fraud-score model from among the multiple fraud-score models, the best fraud-score model being the fraud-score model that most accurately predicts fraud-transactions.

6. The computing device of claim 5, wherein selecting the best fraud-score model comprises, when more than one model predicts fraud-transactions with the same accuracy, selecting the fraud-score model that identifies the most fraud-transactions with the same accuracy.

7. The computing device of claim 6, further configured to execute the software application to provide operations comprising:

generating model performance information for the new fraud-score model, using pre-existing transaction data;
sending the model performance information for review; and
receiving a fraud-score cancel-threshold from the review.

8. A method for automatically suspending and scheduling cancellation of fraudrisk transactions comprising:
receiving, by a processor of a computing device from a database, a first dataset indicating a quantity of fraud-transactions, the first set of data generated at least in part by a fraud-score model;
receiving, by the processor of the computing device from the database, a second dataset indicating a quantity of false positive transactions from the fraud-transactions;
transforming, by the processor, the first dataset and the second dataset into a fraud error rate;
comparing, by the processor of the computing device, the fraud error rate with a predefined error rate; and
generating, by the processor of the computing device, in response to the error rate exceeding the predefined error rate, a new fraud-score model by:
constructing an initial modeling dataset of transactions, each having at least one transaction attribute, received from the database;
generating at least one bin from the initial modeling dataset to group at least a subset of the transactions having common transaction attributes; and
generating a modeling dataset based on the at least one bin and a statistical correlation to fraud-transactions;
wherein the second dataset indicating a quantity of false positive fraud-transactions includes fraud-transactions initially put on-hold and scheduled to be canceled where customer feedback identified the transaction as a false positive fraud-transaction before the transaction was canceled.

9. The method of claim 8, further comprising:
determining a fraud cancellation model that includes the fraud-score model and a fraud-score cancel-threshold in response to the review of the model performance information generated from the new fraud-score model based at least in part on pre-existing transaction data; and
using the new fraud cancellation model to evaluate a set of transactions and determine whether each of the transactions is a fraud-transaction.

10. The method of claim 9, wherein determining the fraud-score cancel-threshold in response to the review is selected to achieve a specific objective related to at least one of a resource usage and a quality rate.

11. The method of claim 10, wherein the specific objective is to reduce the amount of fraud investigations by a predetermined amount.

12. The method of claim 8, further comprising receiving additional first and second datasets at predetermined increments of time and calculating a subsequent fraud error rate based on the additional datasets to determine whether to generate the new fraud-score model.

13. The method of claim 8, wherein generating the new fraud-score model includes generating multiple fraud-score models and selecting the best fraud-score model from among the multiple fraud-score models, the best fraud model being the fraud-score model that most accurately predicts fraud-transactions, and when more than one model predicts fraud-transactions with the same accuracy then selecting the fraud-score model that identifies the most fraud-transactions with the same accuracy.

14. A non-transitory computer-readable medium tangibly embodying computer-executable instructions comprising instructions that when executed by a processor of a computing device configured to automatically suspend and schedule cancellation of fraudrisk transactions causes the processor to:
receive, from a database, a first dataset indicating a quantity of fraud-transactions, the first set of data generated at least in part by a fraud-score model;
receive, from the database, a second dataset indicating a quantity of false positive fraud-transactions from the fraud-transactions;
compare the fraud error rate with a predefined error rate; and
generate, in response to the error rate exceeding the predefined error rate, a new fraud-score model by:
construct an initial modeling dataset of transactions, each having at least one transaction attribute, received from the database;
generate at least one bin from the initial modeling dataset to group at least a subset of the transactions having common transaction attributes; and
generate a modeling dataset based on the at least one bin and a statistical correlation to fraud-transactions;
wherein the generating of the new fraud-score model includes generating multiple fraud-score models and selecting the new fraud-score model from the multiple fraud-score models that most accurately predicts fraud-transactions, and when more than one model predicts fraud-transactions with the same accuracy then selecting the fraud-score model that identifies the most fraud-transactions with the same accuracy.

15. The computer-readable medium of claim 14, wherein the second dataset indicating a quantity of false positive fraud-transactions includes fraud-transactions initially put on-hold and scheduled to be canceled where customer feedback identified the transaction as a false positive fraud-transaction before the transaction was canceled.

16. The computer-readable medium of claim 14, further comprising instructions that when executed by a processor causes the processor to:
determine a fraud cancellation model that includes the fraud-score model and a fraud-score cancel-threshold in response to the review of the new fraud-score model evaluated using pre-existing transaction data; and
use the new fraud cancellation model to evaluate a set of transactions and determine whether each of the transactions is a fraud-transaction.

17. The computer-readable medium of claim 16, wherein determining the fraud-score cancel-threshold in response to the review is selected to reduce the amount of fraud investigations by a predetermined amount.

18. The computer-readable medium of claim 14, further comprising instructions that when executed by a processor causes the processor to receive additional first and second datasets and calculate a subsequent fraud error rate based on the additional datasets to determine whether to generate a new fraud-score model.

* * * * *